June 14, 1932.  C. CHRISTOFFERSON  1,862,659
FILTER
Filed April 12, 1930   2 Sheets-Sheet 1
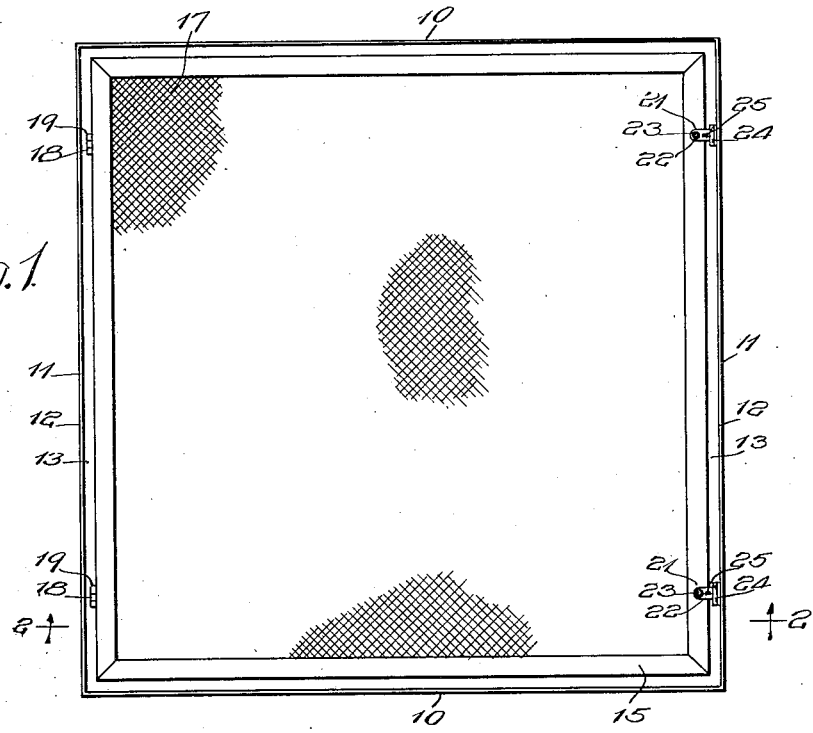
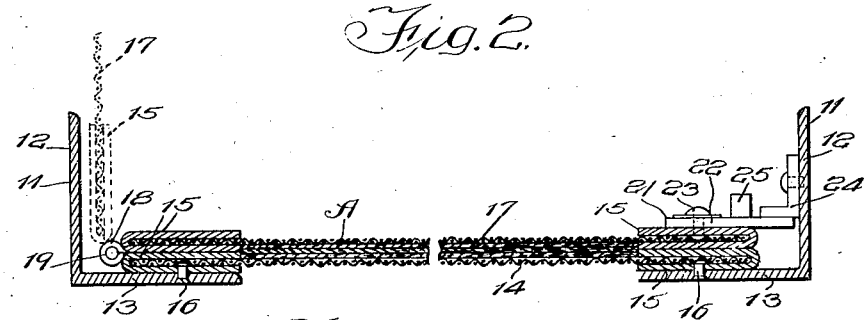
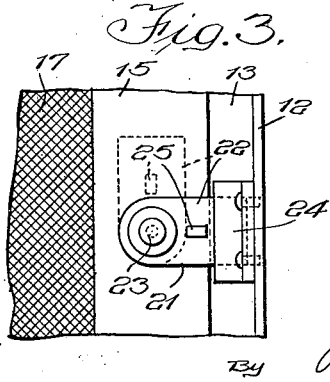
Witness:
William P. Kilroy
Inventor:
Charles Christofferson
By Joseph Harris
His Atty.

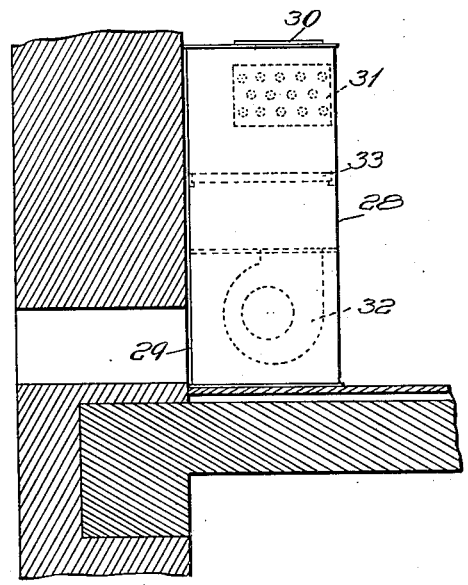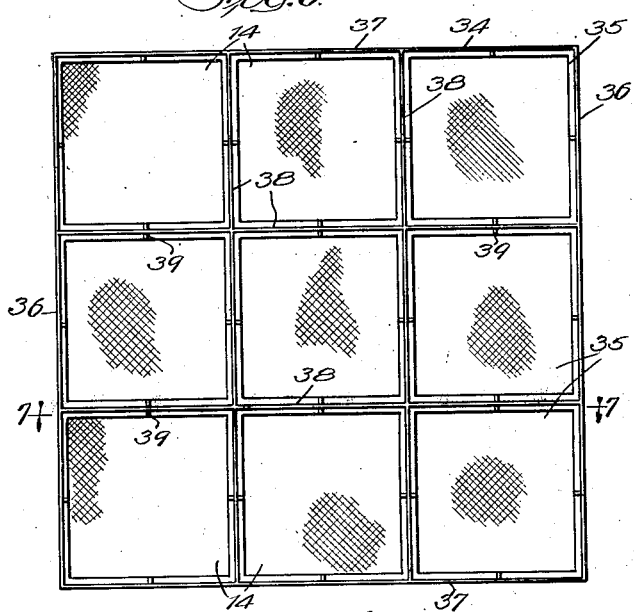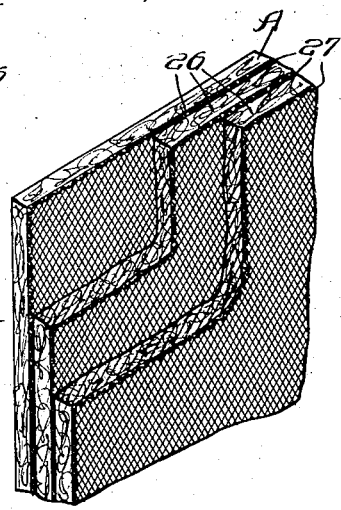

Patented June 14, 1932

1,862,659

UNITED STATES PATENT OFFICE

CHARLES CHRISTOFFERSON, OF DULUTH, MINNESOTA

FILTER

Application filed April 12, 1930. Serial No. 443,638.

This invention relates to improvements in air filters for ventilators and ventilating systems.

One object of the invention is to provide a simple and efficient air filter for ventilating systems and unit ventilators wherein the air is filtered by passing the same successively through a plurality of filter sheets, which together form the complete filtering member and wherein the sheets are readily removable so that the same may be entirely replaced by new clean sheets of material, thereby doing away with the operation of cleaning the filter sheets and effecting a great saving in time and labor.

Another object of the invention is to provide sheets of filtering material in connection with an air filter of the character indicated in the preceding paragraph, which is highly efficient and yet may be economically and cheaply manufactured.

Yet another object of the invention is to provide an air filter of the character indicated including a composite filter member comprising a plurality of individual filter sheets arranged in the form of a pack composed of a plurality of sets of sheets, each set comprising a sheet of loose mesh and a sheet of fine mesh cotton fibers, through which the air is passed successively in being filtered, first through the loose mesh and then through the fine mesh sheet of each set.

A still further object of the invention is to provide a filter unit for ventilators comprising a holder within which filtering sheet material of porous construction is removably carried, the holder being so designed that the sheet material may be readily removed for replacment and renewal when necessary.

Another object of the invention is to provide, for use in a ventilating system, a filtering member including a supporting framework having a plurality of openings in each of which a filtering unit of the character specified in the preceding paragraph is removably mounted, whereby a sectional filter means is provided composed of a plurality of individual filter units, which may be separately removed for individual replacements and renewals.

A still further object of the invention is to provide a filter member of the character indicated in the preceding paragraph built up of a plurality of like filter units, whereby filter members of various sizes may be produced by increasing or decreasing the number of individual units employed.

Other objects of the invention will more clearly appear from the description and claims hereinafter following.

In the drawings, forming a part of this specification, Figure 1 is a plan view of a filter unit embodying my improvements. Figure 2 is a transverse, sectional view corresponding substantially to the line 2—2 of Figure 1, said view being on an enlarged scale and partly broken away to accommodate the same to the sheet of the drawing. Figure 3 is a detailed plan view of a latch member employed in connection with my filter unit, said view also showing a portion of the framework and adjacent structure of the unit. Figure 4 is a detailed, perspective view of a pack of sheet material employed in connection with my improved filter unit, said view showing the sheets forming the pack on a greatly enlarged scale and certain of the sheets being broken away to more clearly disclose the invention. Figure 5 is a diagrammatic view of a combined heating and ventilating unit illustrating the manner of applying my improved filter thereto. Figure 6 is a plan view of a sectional holder in connection with which a plurality of my improved filtering units are employed. And Figure 7 is a transverse, sectional view corresponding substantially to the line 7—7 of Figure 6.

In carrying out my invention, I employ the improved filtering unit in connection with the usual unit ventilator or a more elaborate ventilating system in connection with which the usual heating devices are employed for heating the filtered air.

My improved unit may be made of any desired size and as most clearly illustrated in Figures 1 and 2 of the drawings comprises a rectangular framework composed of top and bottom members 10—10 and side members 11—11. Each of the members 10 and 11 are of angle shape cross section, having an upstanding wall 12 and an inwardly projecting flange portion 13. The flanged portions 13—13 of the sections 10 and 11 lie in a common plane, as most clearly illustrated in Figure 2. The top and bottom sections and the side sections are joined at the corners in any suitable manner, and the same may be welded together. A wire screen member 14 of rectangular form is secured to the framework formed by the members 10 and 11 and overlies the opening of the frame, the longitudinal and transverse edge portions of the screen 14 being secured to the flanges 13—13 of the frame. The outer edges of the screen 14 are preferably protected by a U-shaped metal strip 15, which is clamped about the same. As shown in Figure 2, the strip 15 also serves as means for fixing the screen to the flanges 13, securing rivets 16—16 being employed, which extend through said flanges and the adjacent sections of the U-shaped strips. A second screen 17 cooperates with the screen 14 and said screens together form holding means for supporting the pack of filtering material, which is indicated by A. The screen 17 also has the edges embraced and reinforced by a strip of U-shaped section clamped thereon, as clearly shown in Figure 2. The two screen members 14 and 17 are hinged to each other, the strips 15—15 on the lefthand side as viewed in Figures 1 and 2 being provided with cooperating hinge eye portions 18—18, which are connected by the usual hinge pins 19—19. As will be evident, the screen member 17 is thus hinged within the frame for movement toward and away from the screen 14. In order to hold the screen members in clamping position, a pair of latches 21—21 are employed. Each latch means comprises a pivoted plate 22 secured to the reinforcing strip 15 at the free edge of the screen 17 by means of a pivot member 23. Each pivot plate 22 cooperates with a fixed abutment member 24 in the form of an angle plate riveted to the corresponding side wall member 12 of the frame. As shown most clearly in Figure 2, the latch plate 22 engages underneath the projecting arm of the corresponding angle plate 24 and is provided with an upstanding finger piece 25 by which the same may be manipulated.

The pack of sheet material A, as most clearly shown in Figure 4, comprises three sets of two sheets each of pervious material. Each set of sheets comprises a sheet 26 of relatively coarse, porous structure and a sheet 27 of much finer porous structure. The sheet 26 is preferably composed of cotton fibers, relatively loosely arranged so as to provide a loose mesh or relatively coarse, porous structure. The sheet 27 is preferably composed of relatively closely arranged cotton fibers, thereby providing a relatively fine mesh sheet or relatively fine porous structure. Although the two sheets of material 26 and 27 are herein illustrated as composed of loose mesh and fine mesh cotton fiber, it will be evident that the invention is not limited to this precise construction, but that woven fabrics of large and small mesh may be employed. It is also within the invention to employ other material than cotton fiber, for example the two filter sheets 26 and 27 may be composed of paper pulp or similar material, as long as one of the same presents a coarse porous structure and the other a structure having relatively fine pores or openings. As clearly shown in Figure 4, the pack of filtering sheet material is composed of three sets of sheets 26—27 in which the sheets of each set are similarly arranged, that is the sheets 27 are alternated with the sheets 26. The pack of sheet filtering material A is interposed between the two screen members 14 and 17 and clamped in position therebetween.

As shown in Figure 5, the improved filter unit is employed in a unit ventilating system comprising a casing 28 having an inlet opening 29 through which the air is drawn into the casing and an outlet opening 30 at the top thereof, through which the air is ejected into the apartment to be heated and ventilated. The casing contains the usual heating apparatus 31 disposed in the top portion thereof, and the usual blower fan 32 in the bottom of the same adjacent the intake opening 29. My improved filtering u.. is interposed between the blower 32 and the heater 31 and forms a partition wall, indicated by 33, which extends entirely across the casing. In the arrangement shown in Figure 5, the air passes upwardly from the blower 32 through the filtering unit 33 into the top part of the casing, where the same is heated and then passes out through the opening 30. The filter pack A is so arranged within the framework between the screens 14 and 17 that the filter sheet 26 of said pack, which is outermost, is disposed immediately adjacent the side of the filter unit at which the blower is located. As will be evident, the stream of air passing from the blower to the upper part of the chamber 28 first passes through the outermost sheet 26, which is of coarse mesh and then through the adjacent sheet 27 of finer mesh. In passing through these two sheets successively, the larger particles of dirt or foreign material are first extracted by the sheet 26, and then the smaller or finer particles extracted by passing through the sheet 27. This operation is repeated as the air passes through each successive set of sheets of the filter pack. As will be evident, while three sets of filter sheets are found desirable, either a greater or lesser number of sets may be employed. By providing a plurality of sheets of cotton fibers, which are removable and replaceable within the filtering unit, the filter may be restored to its normal operative condition when the same becomes clogged with dirt and other foreign material by merely replacing new cotton fiber sheets for the old ones. As will be evident, the use of cotton fiber sheet material provides a cheap and economical construction of filtering sheets, the cost of which is so low that it is far more economical to replace worn out sheets with new ones than to attempt to clean the sheets and replace the same as has been done heretofore in connection with filtering members in which metal screens are employed as filtering means, the metal screens being ordinarily coated with oily material to gather the dust and dirt from the air passing therethrough.

In connection with ventilating systems in which relatively large air filtering members are necessary, I preferably employ a supporting structure in connection with which a plurality of filter units of the character hereinbefore described are employed, thereby providing a sectional filter member, the individual sections of which are removable and replaceable, as most clearly disclosed in Figures 6 and 7. As shown in said figures, the supporting member is in the form of a rectangular frame 34 having a plurality of rectangular openings 35 therein, within each of which one of my improved filter units is seated. The frame member 34 comprises spaced parallel side members 36—36 and spaced parallel top and bottom members 37—37, the members 36 and 37 being of angle cross section, as clearly shown in Figure 7. The side members 36—36 and the top and bottom members 37—37 are connected by spaced bars 38—38 of T-shape cross section, as clearly shown in Figure 7. In the form of supporting frame illustrated in Figure 6, the top and bottom members 37—37 are connected by two of the bars 38, which are spaced equally apart and the two side members 36—36 are similarly connected by two bars 38—38, thereby providing nine rectangular chambers 35—35 which accommodate the filtering units. As illustrated in Figure 7, each filtering unit is fitted within the corresponding rectangular opening of the frame member 34 so that the upstanding wall parts 12—12 rest on the laterally projecting flanges of the T-bars and L-bars forming said supporting structure and the flanges 13 of said units are disposed inwardly of the outer edges of the web portions of said members 36, 37 and 38. In order to retain the units within the openings of the supporting frame, a plurality of cotter pins or similar holding means 39—39 are employed, the same extending through openings provided in the webs of the members 36, 37 and 38 outwardly of the flanges 13—13 of the filter units. As will be obvious, each of the filter units employed in connection with the supporting frame structure 34 may be separately and individually removed and replaced when the same becomes useless due to filling up or clogging with dust or other foreign material.

From the preceding description taken in connection with the drawings, it will be evident that I have provided an exceedingly simple and efficient air filtering device, the parts of which may be readily renewed and replaced, thereby doing away entirely with the tedious operation of cleaning the filtering sheets or screens and replacing the same after being cleaned. By providing the plurality of sets of sheets of fiber material, having in each set a sheet of coarse porous structure and a sheet of relatively fine porous structure, the efficiency as to purifying and cleaning the air is greatly increased, while the volume of air passing through the filtering material is maintained relatively great in that little resistance to the passage of the air is presented by the plurality of filter sheets because the arrangement does not require the use of sheets having excessively small pores of perforations.

I have herein shown and described what I now consider the preferred manner of carrying out my invention, but the same is merely illustrative and I contemplate all changes and modifications that come within the scope of the claims appended hereto.

I claim:

1. In a filter unit, the combination with an open rectangular frame comprising spaced top and bottom members and spaced side members having flanges lying in a common plane; of a rectangular, metal screen; a frame within which said screen is clamped, said last named frame being fixed to the inner sides of the flanges of the first named frame; a second rectangular screen; a frame within which said second named screen is clamped, said last named frame being hinged at one edge to said second named frame; sheet filtering material between said screens; and means on said first named frame locking said hinged frame in position in clamping relation to the filter sheets between said screens.

2. In a filter unit, the combination with an open rectangular frame, said frame having top, bottom and side members defining the opening thereof, said members having inwardly directed flanges lying in a common plane and outstanding right angular flanges; of a rectangular metal screen fixed to the inwardly directed flanges and spanning the opening of said rectangular frame; a second screen hinged to said first named screen at one edge; latch members pivotally mounted on the opposite edge of said second named screen; retaining lugs on the outstanding flange at the corresponding side of said frame member, beneath which said latch members are engaged to lock said second named screen in overlying, closed relation, with respect to said first named screen; and sheet filtering material clamped between said screens.

It witness that I claim the foregoing I have hereunto subscribed my name this 8 day of April, 1930.

CHARLES CHRISTOFFERSON.